(12) United States Patent
Banerjee et al.

(10) Patent No.: US 11,082,125 B2
(45) Date of Patent: Aug. 3, 2021

(54) SYSTEMS AND METHODS FOR EXPERT GUIDED RULE BASED IDENTIFICATION OF RELEVANT PLANETARY IMAGES FOR DOWNLINKING OVER LIMITED BANDWIDTH

(71) Applicants: Ayan Banerjee, Tempe, AZ (US); Sandeep Gupta, Tempe, AZ (US)

(72) Inventors: Ayan Banerjee, Tempe, AZ (US); Sandeep Gupta, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 16/775,984

(22) Filed: Jan. 29, 2020

(65) Prior Publication Data
US 2020/0244347 A1    Jul. 30, 2020

Related U.S. Application Data

(60) Provisional application No. 62/798,423, filed on Jan. 29, 2019.

(51) Int. Cl.
*H04B 7/185*        (2006.01)
*G06K 9/00*         (2006.01)
(Continued)

(52) U.S. Cl.
CPC ......... *H04B 7/18513* (2013.01); *G06F 16/29* (2019.01); *G06K 9/0063* (2013.01);
(Continued)

(58) Field of Classification Search
CPC .. H04B 7/18513; G06F 16/29; G06K 9/0063; G06K 9/3233; G06K 9/623; G06K 9/6259; G06K 9/6277; G06N 5/022; G06N 5/025
See application file for complete search history.

(56) References Cited

U.S. PATENT DOCUMENTS

| 9,626,521 | B2 | 4/2017 | Gupta et al. |
| 9,642,543 | B2 | 5/2017 | Banerjee et al. |
| 9,706,963 | B2 | 7/2017 | Gupta et al. |
| 10,074,028 | B2 | 9/2018 | Gupta et al. |

(Continued)

FOREIGN PATENT DOCUMENTS

WO    2015095530 A1    6/2015

OTHER PUBLICATIONS

Manning, C. D.; Raghavan, P.; and Schutze, H. 2008. Introduction to Information Retrieval. Cambridge University Press, 1st edition.

*Primary Examiner* — Yuwen Pan
*Assistant Examiner* — Angelica M Perez
(74) *Attorney, Agent, or Firm* — Polsinelli PC (57) ABSTRACT

Various embodiments disclosed herein relate to systems and methods for an intelligent autonomous decision making module that maximizes the return of the most scientifically relevant dataset over the low bandwidth for experts to analyze further. A rule based knowledge extraction methodology is disclosed, guided by expert knowledge for all scientifically relevant geological landforms with respect to expert selected attributes. The datasets are subsequently prioritized based on how novel the instances are with respect to its rule and is used to update the rules. The effectiveness of the proposed approach is then determined by evaluating how acceptable the prioritization order is to experts and explaining the decisions to increase the interpretability of the assigned priority.

17 Claims, 7 Drawing Sheets
(4 of 7 Drawing Sheet(s) Filed in Color)

(51) Int. Cl.
*G06N 5/02* (2006.01)
*G06F 16/29* (2019.01)
*G06K 9/62* (2006.01)
*G06K 9/32* (2006.01)

(52) U.S. Cl.
CPC .......... *G06K 9/3233* (2013.01); *G06K 9/623* (2013.01); *G06K 9/6259* (2013.01); *G06K 9/6277* (2013.01); *G06N 5/022* (2013.01); *G06N 5/025* (2013.01)

(56) References Cited

U.S. PATENT DOCUMENTS

| | | |
|---|---|---|
| 10,342,447 B2 | 7/2019 | Banerjee et al. |
| 10,575,788 B2 | 3/2020 | Gupta et al. |
| 10,671,735 B2 | 6/2020 | Gupta et al. |
| 2007/0143345 A1* | 6/2007 | Jones .................... G06F 16/288 |
| 2013/0317377 A1 | 11/2013 | Gupta et al. |
| 2016/0313779 A1 | 10/2016 | Gupta et al. |
| 2018/0301061 A1 | 10/2018 | Paudyal et al. |
| 2018/0336019 A1* | 11/2018 | Schmidt ................ G06F 16/252 |
| 2019/0188587 A1 | 6/2019 | Gupta et al. |
| 2019/0212803 A1 | 7/2019 | Gupta et al. |
| 2019/0354087 A1 | 11/2019 | Gupta et al. |
| 2020/0108203 A1 | 4/2020 | Lamrani et al. |

\* cited by examiner

SYSTEMS AND METHODS FOR EXPERT GUIDED RULE BASED IDENTIFICATION OF RELEVANT PLANETARY IMAGES FOR DOWNLINKING OVER LIMITED BANDWIDTH

CROSS-REFERENCE TO RELATED APPLICATIONS

This is a non-provisional application that claims benefit to U.S. provisional application Ser. No. 62/798,423 filed on Jan. 29, 2019, which is herein incorporated by reference in its entirety.

FIELD

The present disclosure generally relates to transmission of data associated with a spacecraft; and, in particular, to an autonomous decisions making module defining expert guided rule based identification of relevant planetary images for downlinking over limited bandwidth.

BACKGROUND

Vast amount of data acquired by instruments onboard spacecraft offer rich insights that improve understanding of the observed planetary surfaces. However, as the data from deep space missions is transmitted over a limited bandwidth before the next orbit, the available downlink volume is significantly lower than acquired data volume. Under the current setting, only a subset of the acquired observations allowed by the available transmission bandwidth is downlinked to Earth before the next orbit. This subset selection does not leverage any intelligent decision making strategy aimed at identifying the datasets that are scientifically significant for further analysis by domain experts. This may result in the loss of scientifically valuable observations for experts to analyze.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

The present disclosure relates to systems and methods for an intelligent autonomous decision making module operating remotely onboard a spacecraft to prioritize the transmission of datasets that have high significance for further analysis. In particular, a generalized decision-making module is disclosed herein which is not limited to any application-specific novelty. A metric relevance score is further introduced that takes into account the scientific value of the data.

The objective of this module is to emulate expert-like identification of relevant datasets thereby maximizing the return of high value data over limited bandwidth. As described, this disclosure focuses on geological features which are deemed interesting to experts in planetary images. All observations with these expert identified interesting landforms (ILFs) have a high downlink priority. Additionally, downlink priority should also depend on how novel or anomalous the instance is with respect to expert defined attributes. ILFs can be characterized as novel or anomalous based on several other expert identified scientific attributes such as spatial location, season as well as association with other ILFs. However, the more novel or anomalous the instance is with respect to expert defined attributes, the higher is its value for analysis and hence higher downlink priority.

Figure 1:
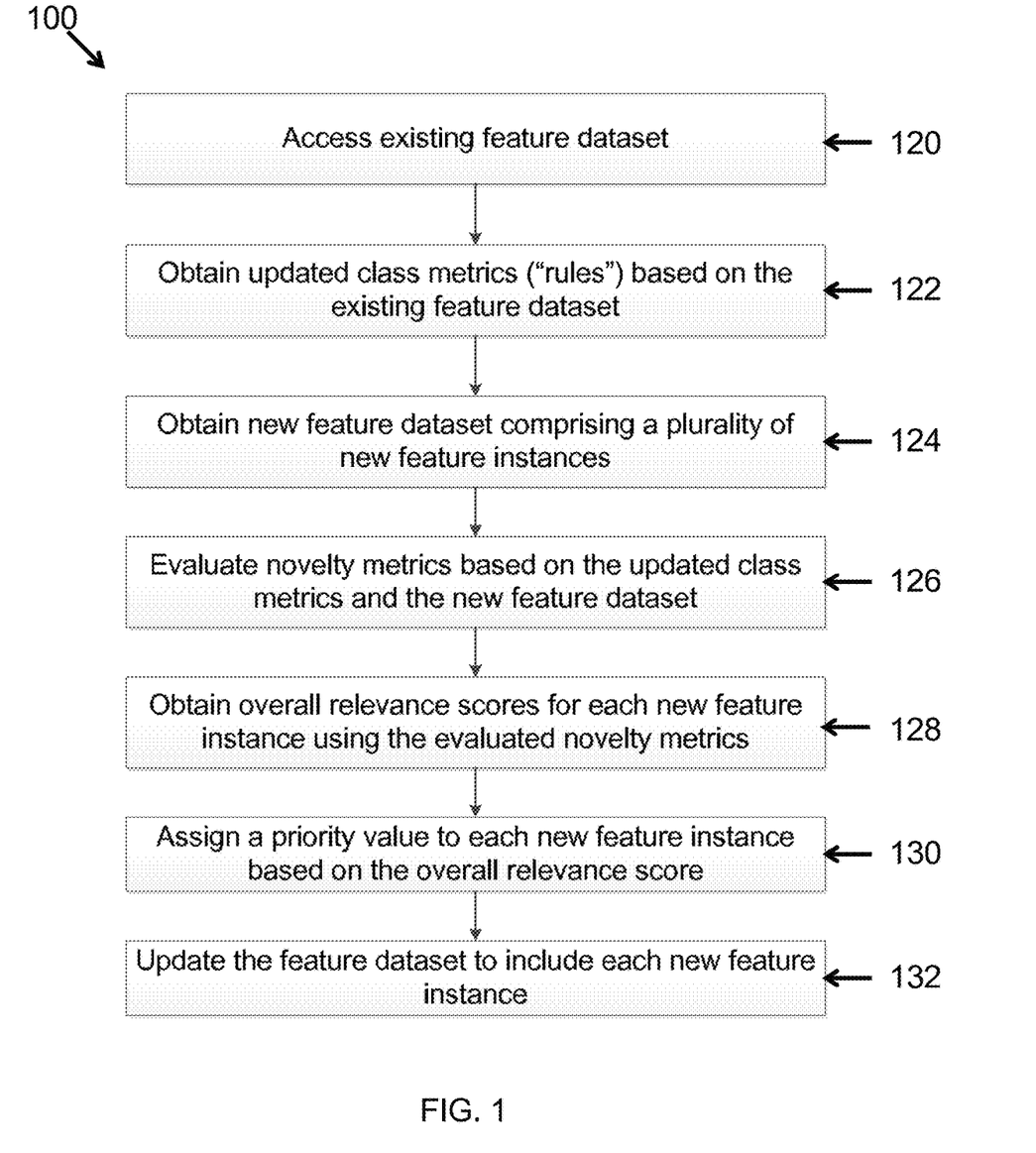
FIG. 1 is a flowchart illustrating the overall methodology for rule extraction and prioritization.

The present disclosure describes an expert guided rule formation methodology 100 where the rules represent each ILF with respect to the attributes. This methodology 100 is illustrated in FIG. 1. These rules define the expected features of each ILF (also referred to herein as a "feature class") with respect to the attributes. Deviation of an ILF bearing instance (also referred to herein as a "feature instance") from its rule causes it to be more significant for further investigation. The relevance score is used to quantify the degree of novelty of an ILF bearing instance, where the relevance scores with respect to the attributes based on deviation from the learned rules. In order for this approach to generate an expert acceptable priority order, the rules have to be aware of domain knowledge through expert decisions, on whether or not to downlink the instance and the expert explanation of factor (the attribute that influenced the decision). This enables the rules to learn expert preferences which guide the rules appropriately to achieve expert-like decision making. The factor or attribute explanation allows incorporation of prior domain knowledge to guide the rules in the decision making process. Subsequently, along with deciding on the novelty score of an instance, the system also lists the attributes with respect to which the instance is novel, explaining why the decision was made to increase the expert's trust in the system. The framework was evaluated on images from the early operation stage of the Thermal Emission Imaging System (THEMIS) instrument onboard the Mars Odyssey spacecraft. The evaluation is repeated over successive orbits when the rules are updated to account for any changes. It is observed that the acceptability of the rule generated ranking to experts increases when domain knowledge is incorporated. Thus, the disclosed framework is capable of assigning acceptable downlink priority to relevant images and shows potential to maximize the return of most valuable scientific data in the resource constrained environment.

Prioritization by Identifying Anomalous Instances

In this section, a knowledge extraction methodology 122 is disclosed based on rule discovery that defines the expected attributes of each ILF. Under the prioritization criterion chosen by experts, any instance containing one or more ILFs has a high priority for downlinking, expressed in terms of relevance score. However, the more unusual the instance is with respect to the rules, the higher is its novelty and relevance score for further investigation. Such unusual instances have higher downlink priority than an ILF bearing instance that meets the expected rules. The novelty of a relevant instance with respect to the rules, is determined based on expert selected novelty factors which are:

- class relevance: the relative relevance of the classes present in the instance for further analysis. Although, all relevant instances contain one or more ILF, which increases its downlink priority, the relevance of each class may vary from expert to expert. Presence of ILFs that are more relevant to the expert, increases the relevance score of the instance.
- spatial context or inter-class associations: the context of the images determined by the association of classes within an instance. For example, all past observations of a given ILF $c_j$ may be associated with the presence of another ILF $c_i$ in the same image. However, in a test image, if ILF $c_j$ occurs by itself or is present with another ILF $c_k$, it increases the relevance score of the instance as it implies aberration in the data generating process that is significant for investigating.
- spatial location: unusual spatial location of any ILF with respect to its previously observed spatial distribution. This increases the relevance score of the instance and assists experts to explore unresearched regions thereby enhancing existing surface maps.
- seasonal information: if an ILF is prevalent during a particular season, any occurrence of that ILF in a different season is considered anomalous and increases the relevance score of the instance it appears in.

Rule Formation of Relevant Classes

Figure 3:
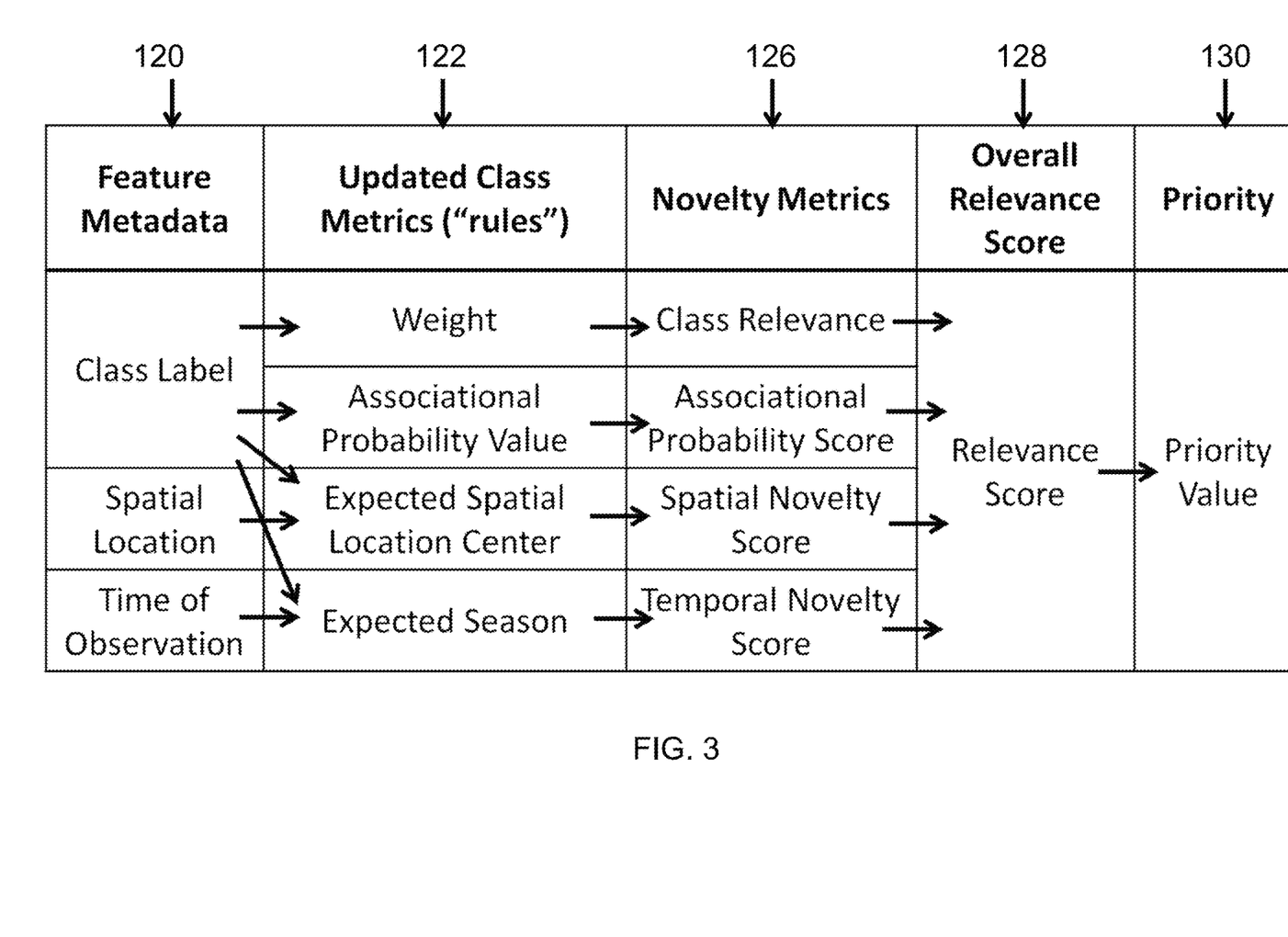
FIG. 3 is a chart illustrating a flow of information which is used to extract a priority value from corresponding feature instance metadata.

The rule based knowledge extraction step defines the expected attributes for each of the C ILFs from its observed instances. Presence of an ILF renders it important for down-linking, however, the rules are used to identify the most unique instances and hence impacts priortization. The rules are learned iteratively from the observations acquired each Mars year ($Myr_y$), where y denotes the year. In a given $Myr_y$, from the set $D_y=\{d_1, d_2, \ldots d_N\}$ of all N observations acquired, the relevant subset $\Theta_y=\{\Theta_1, \Theta_2, \ldots \Theta_{N_C}\}$ containing $N_C$ instances with ILFs are identified by experts. This is referred to as the "feature dataset" or the "dataset" comprised of a plurality of "feature instances". For all $N_C$ instances, experts also provide the instance descriptor θ≡<labels,latitude,longitude,season> for ground based rule generation with respect to the attributes. The set Θ along with the instance descriptors form the training dataset to learn the rules. The step of accessing the dataset of feature instances is listed as 120 in FIGS. 1 and 3. The step of updating the rules (also referred to herein as "class metrics") is denoted as 122 in FIGS. 1-3.

Strength or frequency of any combination of interclass association between ILFs (i, j, . . . , n) is the joint probability of its occurrence within an instance is computed from the training dataset. Strength indicates the likelihood of co-occurrence of two or more ILFs in one instance and does not imply causality. If $|\theta_s|$ denotes the number of instances in $\Theta_y$ such that the ILFs (i, j, . . . , n) appear in $\theta_s$ then the strength of association $S_{i,j,\ldots,n}$ between any the ILFs is computed using $$S_{i,j,\ldots,n} = \frac{|\theta_s|}{N_c}, \quad (1)$$

where $\theta_s \subseteq \Theta_y$.

While a high s indicates that the association between the ILFs is frequently observed, a low s is indicative of an association that is rarely observed, which increases its relevance for further analysis.

In addition to inter-class associations, the rules also incorporate the set of expected latitude and longitude center for each ILF i and this information is utilized in determining spatial anomalies. If a given ILF is detected in a spatial location that is unusual with respect to all previously observed instance of that ILF, such a test instance has a high downlink priority as it prompts experts towards new and previously unknown locations of that ILF, thereby aiding in exploration and enhancing existing surface maps. If $X_i$ and $Y_i$ are the vector of latitudes and longitudes of all instances of ILF i from the training data, its joint density function $p_{xyi}$, is determined using kernel density estimate (KDE) to localize the spatial clusters of occurrence of the given class. The latitude and longitude centers are those ($X_i$, $Y_i$), which causes density function pxy, at $X_i$, $Y_i$ to be a local maxima. All instances of ILF i are then assigned to the closest cluster center ($X_w$, $Y_w$), where w is the number of clusters of the ILF i determined from the KDE. Following cluster assignment, the rules for each class is augmented with the cluster centers and spatial variances ($\sigma_{lat_\omega}$, $\sigma_{long_\omega}$) of each cluster for all ILFs. As a result, the predominant spatial locations of each ILF is the set $\Omega_i = \{(X_{\omega_i} \pm \sigma_{lat_\omega}, Y_{\omega_i} \pm \sigma_{long_\omega})\}$ Additionally, the season of prevalence of each ILF is learned to characterize its seasonal trends. Season of occurrence of each instance of every ILF i is expressed as a binary vector t, whose length corresponds to the number of seasons φ on Mars defined by (MARCI MOC table). For every instance θ of ILF i, if the associated season is φ, then $t_i[k]=1$, for k=φ and $t_1[k]=0$ otherwise, where k=1, . . . , φ. Thus, the expected season of prevalence, E[k] of each ILF i can be expressed as:

$$E[k_i] = \Sigma_{k=1}^{\phi} k \cdot f(k)_i \quad (2)$$

while the seasonal variance is given by $$\sigma(k_i) = \sum_{k=1}^{\phi}(k - E[k_i])^2 \cdot f(k)_i \quad (3)$$

$$\text{where } f(k)_i = \frac{1}{N_{ci}} \sum_{l \in ILF_{ci}} t_\theta[k] \quad (4)$$

represents the prevalence of ILF i in season k in $N_{ci}$ instances out of $N_c$, ILF i appears. $E[k_i]$ for a given ILF i may correspond to one of the seasons or may represent a transitional period between seasons.

Incorporating Expert Knowledge

Rules extracted for every relevant class are initially uninformed of expert preferences and domain knowledge. This may hamper the onboard module's effectiveness in identifying the most scientifically relevant observations to be downlinked for expert analysis. In this section, a technique to enrich the extracted rules by incorporating it with expert knowledge is described. This is essential to determine expert preference of relative importance of each class. Additionally, expert preferences are crucial for refining association strength. This is particularly important when the rules are formulated from local knowledge of a small trailing dataset. For example in the early stages of a mission when only a small fraction of the surface has been observed, expert knowledge is crucial to incorporate global context and reduces any bias that may arise due to limited imaging of the surface. Moreover, this knowledge is utilized to override any data driven rule and guide it with expert knowledge when the relevance of that rule cannot be directly inferred from the data. For example, a frequent association may still bear high significance due to a domain specific reason. Seeking expert feedback ensures that the rules are aware of this domain specific context. However, expecting accurate quantification of this knowledge even by experts is unrealistic and remains a challenge. This knowledge is elicited from experts by recording their rating of images from the training data of $Myr_y$ on the following:

(a) decision D, which is a binary rating on whether the instance is relevant to be downlinked. All instances with an ILF are chosen to be downlinked (b) explanation of decision for highly relevant images, by selecting the factor (ILF relevance, interesting spatial association, unusual spatial location or season of prevalence) that influenced the decision D=1 on a scale of 1 to 5, indicating strength of the factor. The factor is considered to be the explanation for the expert's downlink decision These ratings are used to guide the rules with expert opinion in the form of weights governing the class importance $w_{i,j,\ldots,n}$ and weights for all combinations of observed inter-class associations $w_{i,j,\ldots,n}$. Here $w_i$ represents the relative importance of a class to the experts, whereas $w_{i,j,\ldots,n}$ represents the expert rating on the novelty or importance of association between (i, j, . . . , n). These weights are initially set to unity and then updated to the average normalized expert rating of every instance bearing the ILF i or observed inter-class association (i, j, . . . , n) respectively. The rules formed for each ILF after expert feedback can be expressed as $<(w_i, s_i, \Omega_i, (\mu_{k_i}, \sigma_{k_i})>$ where si is a vector indicating association strength of i with all other class combinations. A feedback form was utilized which displays an image of each ILF category and each observed ILF association to record the corresponding expert weight. These weights are used to determine the class relevance and update the inter-class association strength, while the expected spatial location and season is learned in a data driven manner.

Inference Rules for Prioritization

The rules extracted define the expected attributes with respect to each relevant class. In this section, an inference methodology (divided into steps 126 and 128 of FIGS. 1 and 3) which determines relevance score of the test instances with respect to each attribute of the rules. This is performed using the plurality of feature instances of the dataset to build the rule set, or "class metrics" and then use the class metrics to determine the relevance score for a plurality of new feature instances of a new feature dataset which are obtained during the orbit $Myr_{y+1}$. A higher relevance score is indicative of greater significance of the given instance to be downlinked because it is more likely to be relevant to experts. This prioritized dataset, obtained in step 130 of FIGS. 1 and 3, contains the most relevant instances from $Myr_{y+1}$ that are to be downlinked. Feature instances of the new dataset from $Myr_{y+1}$ are obtained in step 124 of FIGS. 1 and 3. Step 126 shows determination of novelty of each scene with the ILFs using the attributes defined above: class weight, association strengths of multiple feature classes and spatial and temporal anomaly. For an ILF bearing instance τ, that can be described as $<\{i, \ldots, n\}, X_\tau, Y_\tau), t_\tau>$ where $\{i, \ldots, n\}$ denotes ILFs present in τ, $(X_\tau, Y_\tau), t_\tau$ indicates the lat/long and season of τ respectively, the inference rules of relevance scores of T with respect to each attribute is determined by:

class relevance of each ILF class i in the instance, determined by expert weight $$\Sigma_{\forall i \in \tau} w_i \quad (5)$$

novelty of association $a_{i, j, \ldots, n}$ between all ILFs in a given instance determined by:

$$a_{i,j,\ldots,n} = \frac{w_{(i,j,\ldots,n)}}{(s_{(i,j,\ldots,n)} + \epsilon)}, \forall (i, j, \ldots, n) \in \tau \quad (6)$$

where s is the association strength of all ILFs in T computed using equation (1) and a is a constant (f<<<s), representing the strength of previously unseen associations. For unobserved associations, W(1, . . . , n)=1. Here, the inverse of strength indicates how rare the association is.

occurrence of ILFs in a previously unknown location. Spatial novelty is computed using $$\sum_{\forall i \in \tau} \delta_i - \sigma_{lat_{w_i}}, \text{ if } \delta_i > \sigma_{lat_{w_i}} \quad (7)$$

where $\delta_i = \min(|X_\tau - X_{\omega_i}|)$ for all spatial clusters of ILF i. Anomalous longitude occurrence also contributes to novelty score similarly.

occurrence of i in its non-prevalence season, indicating temporal anomaly. The temporal novelty score is computed using $$\sum_{\forall i \in \tau} \delta_t - \sigma_{k_i}, \text{ if } \delta_t > \sigma_{k_i} \quad (8)$$

where $(\delta_t = |t_\tau - \mu_{k_i}|)$.

Rule Update

In step 132 shown in FIG. 1, downlinked instances of $Myr_{y+1}$ are added to the training dataset to update the previously discovered rules from $Myr_y$. Although the expert knowledge elicited from the $Myr_y$ training dataset is retained to guide the updated rules based on expert preferences and domain knowledge, the expert can update their ratings at this phase to appropriately direct the rules to reflect any modifications to the geological classes and its attributes of interest. The expert is informed of any newly discovered spatial location of a given class and guides the rule generator as to whether this discovered location is to form a new cluster or to be added to the nearest previously known cluster. These updated rules from $Myr_{y+1}$ are in turn utilized for prioritizing the dataset of $Myr_{y+2}$.

Evaluation Metrics

The disclosed framework ranks all instances in a test set batch based on how interesting its contents are for experts to analyze. These rankings determine the downlink priority of each image. The effectiveness of the disclosed framework is determined by its ability to generate expert acceptable ranking in a given test batch. Hence, for every test batch, the similarity is evaluated in order of ranking $r=[r_{\tau_1}, \ldots, r_{\tau_B}]$ generated from the rules for each test set batch with that of the expert order of ranking $e=[e_{\tau_1}, \ldots, e_{\tau_B}]$ of the same set, where B denotes the number of instances in each batch and $r_{\tau_b}$ and $e_{\tau_b}$, denotes the rule generated and expert rank of instance $\tau_b$. The metrics used to quantify this similarity in ranking are:

Mean Average Precision (MAP): For a given test set batch q the average precision (AP) is computed at every position b where the rule generated rank $r_{\tau_b}$ the instance $\tau_b$ matches its expert rank $e_{\tau_b}$. This is expressed as $$AP(b)_q = \frac{1}{B}\sum_{b=1}^{B} \gamma_b \quad (9)$$

where $\gamma_b = \begin{cases} p_b, & \text{if } r_{\tau_b} = e_{\tau_b} \\ 0, & \text{otherwise.} \end{cases}$ Here, $p_b$ denotes the precision in detecting the correct ranking of the relevant instances up to position b. MAP is then computed as the mean AP over all the test set batches and is given by $$MAP = \frac{1}{Q}\sum_{q=1}^{Q} AP(b)_q.$$

Spearman Rank Corrleation (SRCp): This computes the correlation in the rule generated rank with the expert ranking of each dataset.

These metrics quantify the goodness of ranking and hence the prioritization order. Maximum attainable value by both metrics is 1. A high value denotes acceptability of the rule generated ranking to experts and implies effectiveness of the rule based methodology in capturing expert preferences by identifying the most relevant instances Dataset and Results Data Description:

The visible imager datasets from the THEMIS has been used in this study. The present dataset comprises all 1600 (single channel band 3) datasets collected from orbits 81 to 239, out of which 300 instances were identified by experts for its relevance for downlinking. Along with the spatial and seasonal attributes of these instances, experts annotated each instance to identify the interesting classes that appeared in it. These annotated images were divided into train and test sets. The training set consists of 99 relevant images from the 550 downlinked instances in the first 71 orbits. This training dataset is used in extracting the rules which are then guided with expert feedback. The remaining 201 relevant images from the 87 subsequent orbits form the test set batches on which the rules are applied to rank it according to its relevance to experts. Each test set batch consists of 8 images which are ranked which are validated with expert acceptance of the ranking to evaluate the effectiveness of the present approach. All instances from the test batch are used to update the rules, which are subsequently evaluated on the next batch.

TABLE 1

Acceptability of rule generated priority to experts using MAP and SRC over all test set batches.

| Rule Forming Methodology | MAP | SRC |
|---|---|---|
| Standalone Rules | 0.1864 | 0.5482 |
| Expert Guided Rules | 0.765 | 0.984 |

Results

In this section the results are discussed to evaluate the effectiveness of the disclosed rule based framework in identifying unusual instances that are relevant to experts for further analysis are discussed. Here, the test sets contain all expert identified instances with the ILFs from each orbit and the relative ranking of instances based on the extracted rules. The stand-alone rules (SA-R) that are solely extracted from the data and the expert guided rules (EG-R) with the expert rankings are compared using the discussed ranking metrics.

Thus, the overall relevance score of an instance is the sum of the ILF relevance score, inter-class association, spatial and temporal relevance scores. However, when two or more instances have equal relevance scores, higher priority is assigned to the instance that has ILFs with higher $w_i$ and $a_{i,j,\ldots,n}$. Furthermore, a second tie-breaker is added that assigns higher priority to the instances with higher types of novelties. For example, an instance with inter-class association, spatial and temporal novelties is assigned a higher priority than an instance with inter-class association and spatial novelties only. Table 1 shows the average acceptability of the prioritization order to experts over all test set batches using all attributes of the inference rules. The standalone rules score poorly using both metrics as these are uninformed of expert preferences. These rules give equal weight to all ILFs and inter-class associations. However, both MAP and SRC demonstrates the improvement in generating expert acceptable ranking after incorporating expert knowledge. This allows the rule in making informed ranking that takes expert preferences into account.

Figure 4:
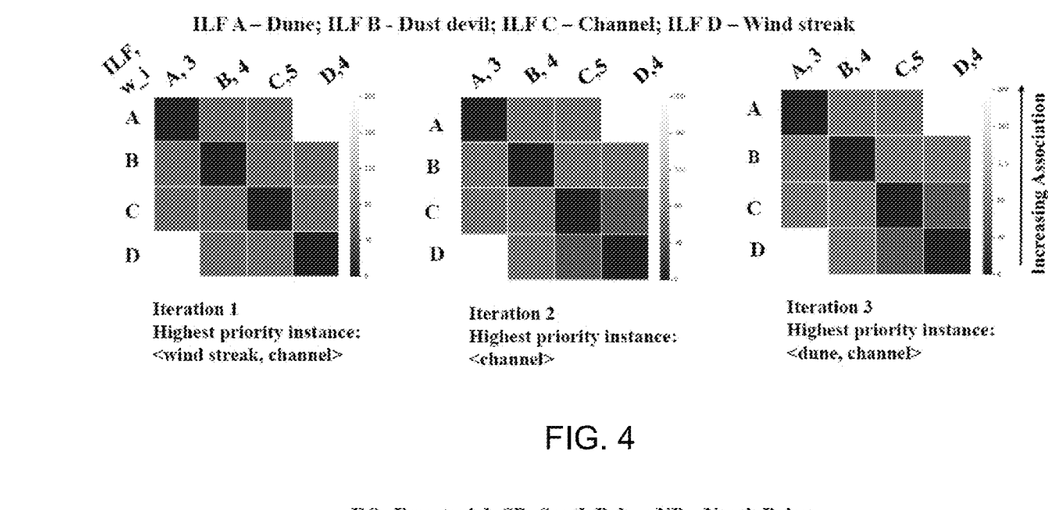
FIG. 4 is a set of graphs illustrating THEMIS infrared and visible images with (a) dune field ROI, (b) valley network ROI, and (c) polar ice cap edge ROI.
Figure 5:
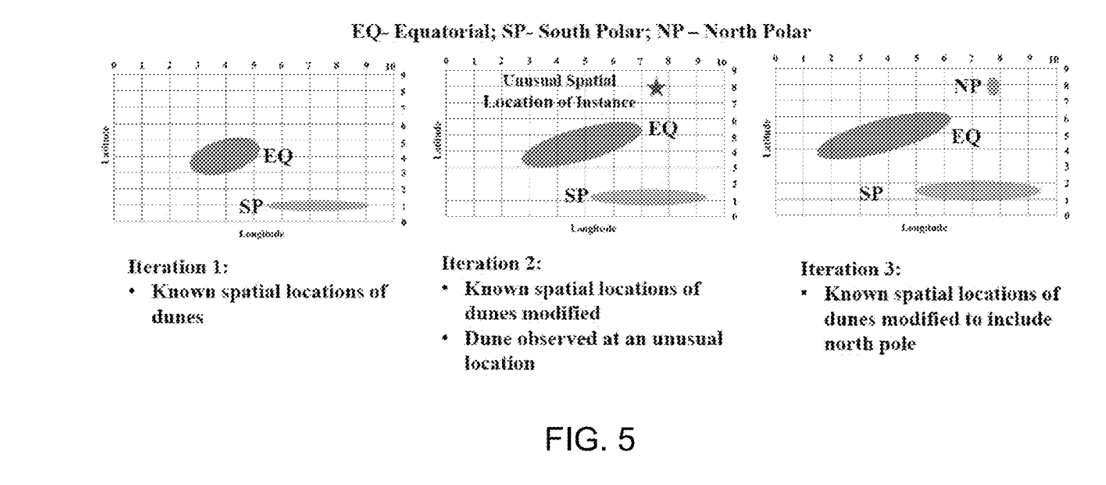
FIG. 5 is a set of graphs illustrating THEMIS infrared and visible images with (a) dune field ROI, (b) valley network ROI, and (c) polar ice cap edge ROI.
Figure 6:
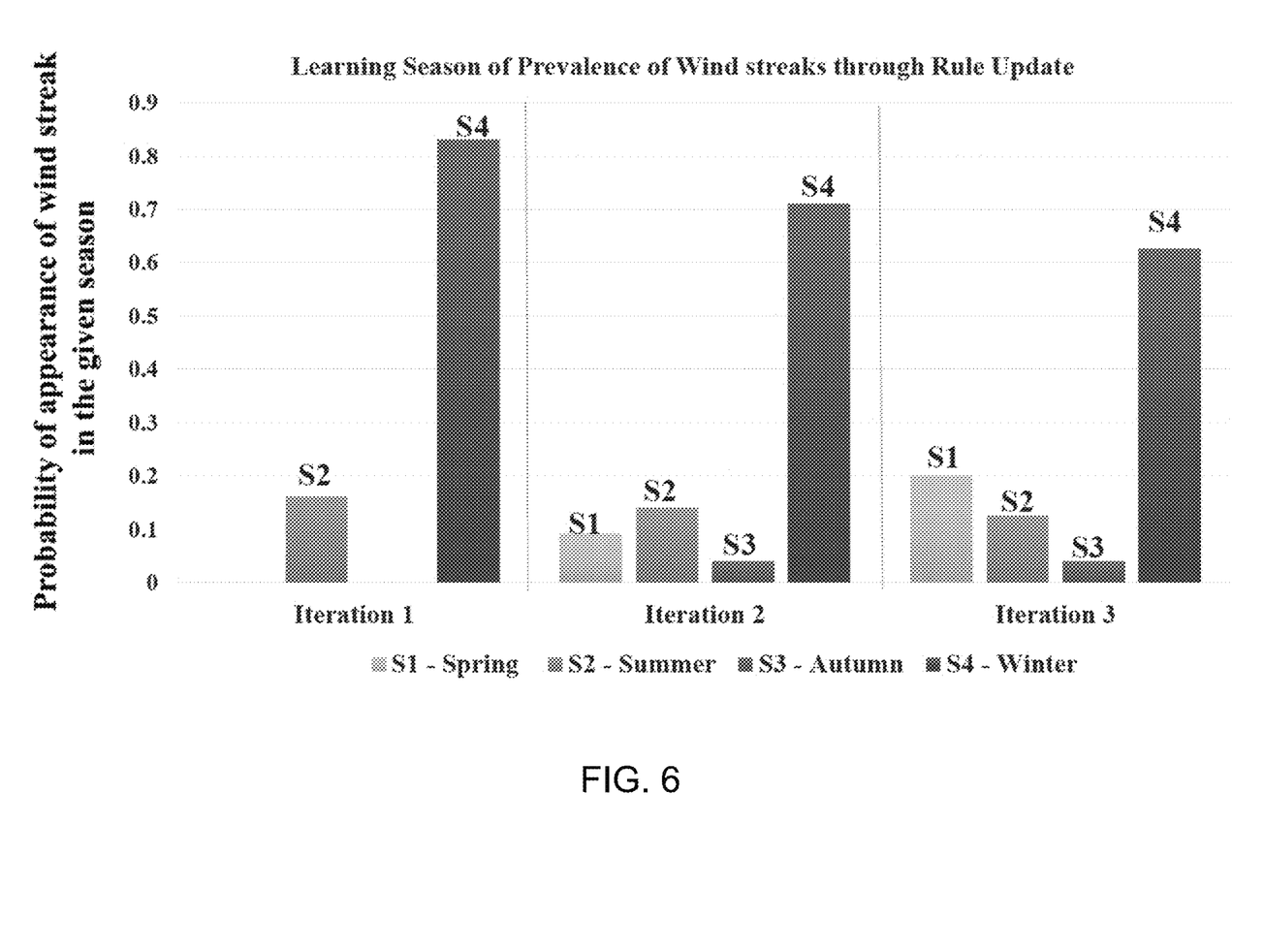
FIG. 6 is a graph showing THEMIS infrared and visible images with (a) dune field ROI, (b) valley network ROI, and (c) polar ice cap edge ROI.

The detection of novel instances is demonstrated by highlighting some examples of high priority instances identified in the test set batches. In FIG. 4, the grids denote the association anomaly score of each ILF with every other ILF (only two-way associations are shown here). The corresponding expert weights of each ILF $w_i$, are shown as (ILF$_i$, $w_i$). Based on these association anomaly scores in iteration 1, the highest priority instance identified contains wind streaks and channels that have high class relevance and association anomaly scores. In the subsequent iterations, the relevance of this association therefore decreases, while the associational novelty scores of unobserved associations such as dune and wind streak remains high. The proposed method also favors instances with channels as it has highest relevance to the expert. In FIG. 5, the discovery of dunes is shown at a location that was unknown based on previous observations. This discovery of dunes at the north pole then updates the existing planetary map for subsequent iterations. In FIG. 6, an example of the seasonal rule update is shown for wind streak. In iteration 1, the knowledge of predominant season is winter, which makes wind streak instances during autumn and summer in the next orbit/batch very unusual and hence is assigned high downlink priority. This is used to update the knowledge of predominant season which results in the updated probabilities in iteration 2. By discovering different types of novel instances, the rules are updated such that highest preference is always assigned to instances that are most novel with respect to the attributes or are previously unobserved. This refinement of the existing knowledge base allows learning the ILF characteristics over time while informing experts about such updates.

Domain Impact of the Disclosed Framework

It is demonstrated that the disclosed rule formation methodology when modified with domain expertise, generates expert acceptable ranking of relevant instances. This has the potential to operate as an independent remote module on planetary orbiters and rovers that assists domain experts by prioritizing downlinking of most relevant datasets allowed by the limited bandwidth. Consequently, this is expected to maximize the return of scientifically relevant datasets over the permitted bandwidth before the next orbit or flyby begins, which in turn would aid experts at exploration and in improving planetary understanding. Additionally, a framework to create a knowledge base from on the planetary datasets based on expert selected attributes is discussed. Another area where such knowledge base has the potential in assisting human experts is in the field of ground based planning of orbiter path for targeting future observations. Orbiter paths are planned so that images from regions of interest (ROI) can be targeted and these planning operations are limited to a couple of hours. The limited time becomes a bottleneck for manually retrieving the most relevant images with ROIs from the large existing data repository. This framework has the potential in assisting experts at planning future orbit paths by pointing them to the most interesting images which require more observations. Moreover, human experts are often interested in a phenomenon that is observed in only a small subset of instances. By retrieving the most relevant instances for the phenomenon of interest, this methodology has the potential to improve the process of scientific exploration.

Figure 7:
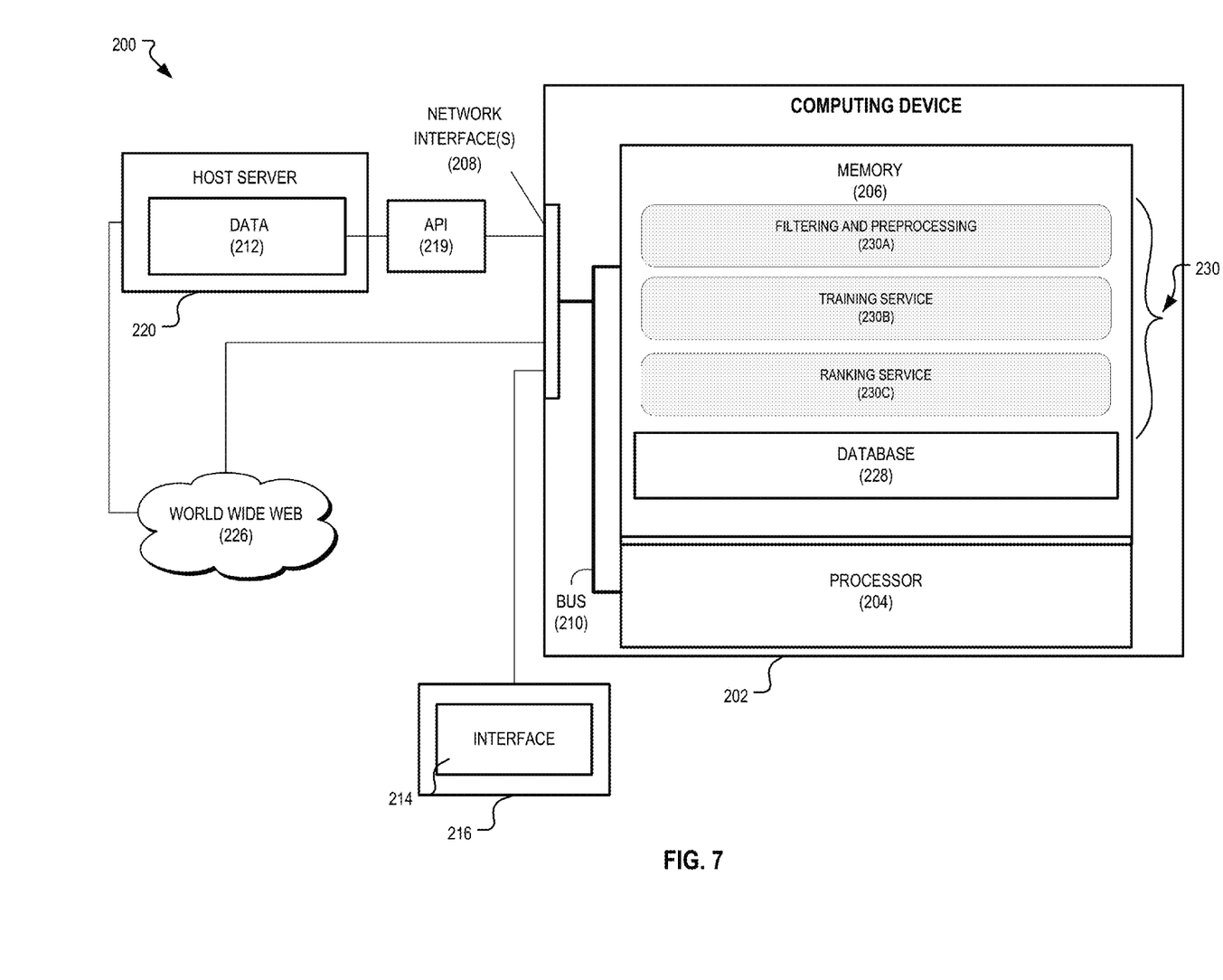
FIG. 7 is one embodiment of a computer-implemented system for extraction and prioritization according to the functionality of FIG. 1.

Referring to FIG. 7, the functionality described in FIG. 1 may be implemented by a system, and in particular, may take the form of a computer-implemented system, designated system 200. In general, the system 200 comprises a computing device 202 including a processor 204, a memory 206 of the computing device 202 (or separately implemented), a network interface (or multiple network interfaces) 208, and a bus 210 (or wireless medium) for interconnecting the aforementioned components. The network interface 208 includes the mechanical, electrical, and signaling circuitry for communicating data over links (e.g., wires or wireless links) within a network (e.g., the Internet). The network interface 208 may be configured to transmit and/or receive data using a variety of different communication protocols, as will be understood by those skilled in the art.

Figure 2:
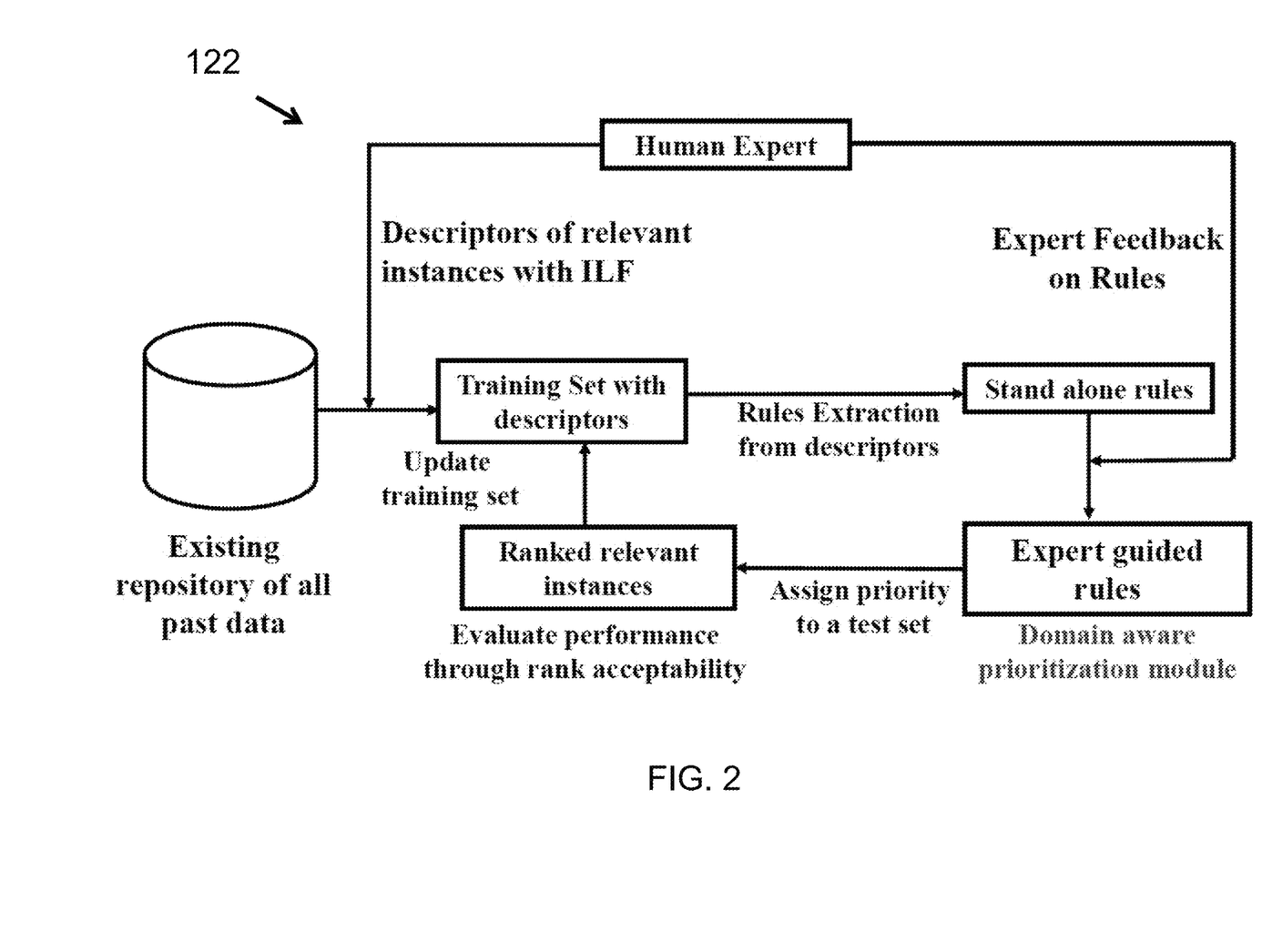
FIG. 2 is a simplified block diagram illustrating an expert-guided rule extraction framework.

As indicated, via the network interface 208 or otherwise, the computing device 202 is adapted to access data 212 (such as from the existing repository of past data in FIG. 2) from a host server 220 which may be stored/aggregated within a storage device (not shown) or locally stored within the memory 206. As further indicated, in some embodiments, the computing device 202 accesses the data 212 by engaging an application programming interface 219 to establish a temporary communication link with the host server 220. Further, the computing device 202 may access the data 212 from the general Internet or World Wide Web 226 as needed, with or without aid from the host server 220.

Databases, tables, and other data structures of the data 212 aggregated or accessed by the computing device 202 may be stored within a database 228. Once this data is accessed and/or stored in the database 228, the processor 204 is operable to execute a plurality of services 230 to process the data or otherwise utilize aspects of the data according to FIG. 1. The services 230 of the system 200 may include, without limitation, a filtering and preprocessing service 230A, a training service 230B, and a ranking service 230C, based on the functionality of FIG. 1. The plurality of services 230 may include any number of components or modules executed by the processor 204 or otherwise implemented. Accordingly, in some embodiments, one or more of the plurality of services 230 may be implemented as code and/or machine-executable instructions executable by the processor 204 that may represent one or more of a procedure, a function, a subprogram, a program, a routine, a subroutine, a module, an object, a software package, a class, or any combination of instructions, data structures, or program statements, and the like. In other words, one or more of the plurality of services 230 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory 206), and the processor 204 performs the tasks defined by the code.

Figure 8:
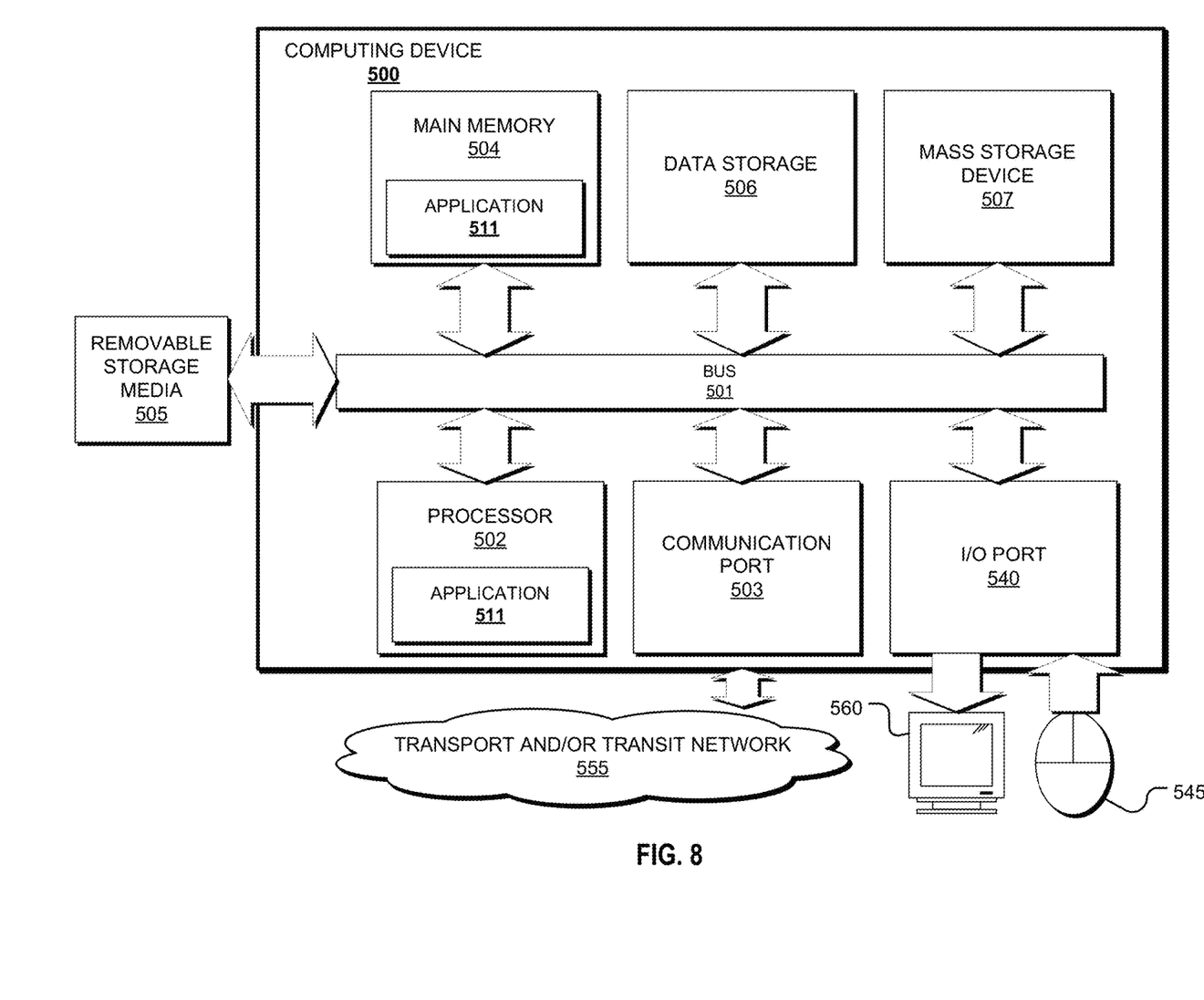
FIG. 8 is an example simplified schematic diagram of a computing device that may implement various methodologies described herein.

Referring to FIG. 8, a computing device 500 is illustrated which may take the place of the computing device 202 and be configured, via one or more of an application 511 or computer-executable instructions, to execute functionality described herein (e.g., FIG. 1). More particularly, in some embodiments, aspects of the methods herein may be translated to software or machine-level code, which may be installed to and/or executed by the computing device 500 such that the computing device 500 is configured to execute functionality described herein. It is contemplated that the computing device 500 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 500 may include various hardware components, such as a processor 502, a main memory 504 (e.g., a system memory), and a system bus 501 that couples various components of the computing device 500 to the processor 502. The system bus 501 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 500 may further include a variety of memory devices and computer-readable media 507 that includes removable/non-removable media and volatile/nonvolatile media and/or tangible media, but excludes transitory propagated signals. Computer-readable media 507 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 504 includes computer storage media in the form of volatile/nonvolatile memory such as read only memory (ROM) and random access memory (RAM). A basic input/output system (BIOS), containing the basic routines that help to transfer information between elements within the computing device 500 (e.g., during start-up) is typically stored in ROM. RAM typically contains data and/or program modules that are immediately accessible to and/or presently being operated on by processor 502. Further, data storage 506 in the form of Read-Only Memory (ROM) or otherwise may store an operating system, application programs, and other program modules and program data.

The data storage 506 may also include other removable/non-removable, volatile/nonvolatile computer storage media. For example, the data storage 506 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 500.

A user may enter commands and information through a user interface 540 (displayed via a monitor 560) by engaging input devices 545 such as a tablet, electronic digitizer, a microphone, keyboard, and/or pointing device, commonly referred to as mouse, trackball or touch pad. Other input devices 545 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 545 are in operative connection to the processor 502 and may be coupled to the system bus 501, but may be connected by other interface and bus structures, such as a parallel port, game port or a universal serial bus (USB). A monitor 560 or other type of display device may also be connected to the system bus 501. The monitor 560 may also be integrated with a touch-screen panel or the like.

The computing device 500 may be implemented in a networked or cloud-computing environment using logical connections of a network interface 503 to one or more remote devices, such as a remote computer. The remote computer may be a personal computer, a server, a router, a network PC, a peer device or other common network node, and typically includes many or all of the elements described above relative to the computing device 500. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 500 may be connected to a public and/or private network through the network interface 503. In such embodiments, a modem or other means for establishing communications over the network is connected to the system bus 501 via the network interface 503 or other appropriate mechanism. A wireless networking component including an interface and antenna may be coupled through a suitable device such as an access point or peer computer to a network. In a networked environment, program modules depicted relative to the computing device 500, or portions thereof, may be stored in the remote memory storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments may be described herein as including one or more modules or services, such as the components of the application 102. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising:
   A processor operable to execute instructions to:
   emulate expert-like identification of relevant datasets by focusing on predetermined geological features, thereby maximizing the return of high value data over limited bandwidth, wherein to emulate, the processor:
   accesses a dataset, wherein the dataset comprises a plurality of feature instances and wherein each of the plurality of feature instances are associated with a feature class of a plurality of feature classes;
   updates a set of class metrics based on each of the plurality of feature instances in the dataset, wherein each of the set of class metrics are associated with expected properties belonging to each of the plurality of feature classes;
   accesses a plurality of new feature instances, wherein each of the plurality of new feature instances are associated with one of the plurality of feature classes;
   evaluates a set of novelty metrics for each of the plurality of new feature instances based on the set of class metrics and the plurality of new feature instances, wherein the set of novelty metrics are associated with how each of the plurality of new feature instances relate to expected properties belonging to a given associated feature class;
   combines the set of novelty metrics as evaluated for each of the plurality of new feature instances to assign an overall relevance score to each of the plurality of new feature instances, wherein a given new feature instance of the plurality of new feature instances having a high overall relevance score indicates a high priority associated with the given new feature instance; and
   updates the dataset to include each of the plurality of new feature instances.

2. The system of claim 1, wherein priority is assigned to each of the plurality of new feature instances based on the overall relevance score, and wherein each of the plurality of new feature instances are ranked based on priority and wherein one or more new feature instances of the plurality of new feature instances having high priority are chosen for transmission.

3. The system of claim 1, wherein each of the plurality of feature instances and each of the plurality of new feature instances is representative of an observed geological feature and comprises a feature class label, a spatial location, and a time of observation.

4. The system of claim 1, wherein the set of class metrics comprises:
   an expected spatial location center, wherein the expected spatial location center is representative of a cluster of feature instances associated with the same feature class;
   an expected season, wherein the expected season is representative of an expected period of occurrence of feature instances associated with the same feature class;
   an associational probability value, wherein the associational probability value is representative of a joint probability of a feature instance associated with a first feature class co-occurring with an additional feature instance associated with a second feature class; and a weight value, wherein the weight value is representative of relevance to research and wherein the weight value is assigned to a feature class based on expert opinion.

5. The system of claim 1, wherein the set of novelty metrics comprises:
   a class relevance score based on a weight value assigned to the feature class associated with one of the plurality of new feature instances;
   an associational novelty score based on an associational probability of the feature class associated with the new feature instance, wherein the associational novelty score is representative of a rarity of the feature class co-occurring with an additional feature instance of a second feature class;
   a spatial novelty score based on a spatial location of the one of the plurality of new feature instances and an expected spatial location center of the feature class associated with the new feature instance and wherein the spatial novelty score is representative of a deviance of the spatial location of the new feature instance from the expected spatial location center of the feature class associated with the new feature instance; and
   a temporal novelty score based on a time of observation of the new feature instance and an expected season of the feature class associated with the new feature instance and wherein the temporal novelty score is representative of a deviance of the time of observation of the new feature instance from the expected season of the feature class associated with the new feature instance.

6. The system of claim 1, wherein the plurality of novelty metrics are combined by summing each of the plurality of novelty metrics such that a single overall relevance value is obtained.

7. The system of claim 1, wherein given one or more new feature instance having equal overall relevance scores, higher priority is assigned to a new feature instance of the one or more new feature instances having a higher novelty of association score or a higher class relevance score.

8. The system of claim 2, wherein a plurality of new feature instances having high priority are chosen based on a transmission window, wherein the transmission window is limited by bandwidth or available transmission time.

9. The system of claim 3, wherein each of the plurality of observed geological features are extraterrestrial in origin.

10. The system of claim 9, wherein each of the plurality of new feature instances are collected during an orbit around a planet, wherein the planet is extraterrestrial.

11. The system of claim 4, wherein the expected spatial location center is determined by finding a local maximum of a density function, wherein the density function is operable for identifying spatial clusters associated with the class and wherein the expected spatial location center is a local maxima of the density function.

12. The system of claim 11, wherein each of the plurality of feature instances and each of the plurality of new feature instances are assigned an expected spatial location based on the local maximum which is nearest to a spatial location of each of the plurality of feature instances and each of the plurality of new feature instances.

13. The system of claim 4, wherein the associational probability value is expressed as a quantity of co-occurring feature instances per total quantity of feature instances comprising the first feature class.

14. The system of claim 13, wherein a low associational probability value is indicative of rare observation of a feature instance of the first feature class co-occurring with a second feature instance of a second feature class and wherein a high associational probability value is indicative of frequent observation of a feature instance of the first feature class co-occurring with a second feature instance of the second feature class.

15. The system of claim 5, wherein the associational novelty score is determined by inverting the associational probability value such that a high associational novelty score is associated with a low associational probability value and a low associational novelty score is associated with a high associational probability value.

16. The system of claim 1, wherein the predetermined geological features include expert identified interesting landforms (ILFs) associated with a high downlink priority.

17. The system of claim 1, wherein at least some of the instructions performed by the processor are part of a decision making module operating remotely onboard a spacecraft to prioritize the transmission of datasets that have high significance for further analysis.

* * * * *